United States Patent
Zia et al.

(10) Patent No.: US 10,538,717 B2
(45) Date of Patent: Jan. 21, 2020

(54) WEAR RESISTANT POLYMER COMPOSITION HAVING IMPROVED SURFACE APPEARANCE

(71) Applicant: Celanese Sales Germany GmbH, Sulzbach, Taunus (DE)

(72) Inventors: Qamer Zia, Frankfurt (DE); Kirsten Markgraf, Weinheim (DE)

(73) Assignee: Celanese Sales Germany GmbH, Sulzbach, Taunus (DE)

(*) Notice: Subject to any disclaimer, the term of this patent is extended or adjusted under 35 U.S.C. 154(b) by 0 days.

(21) Appl. No.: 15/729,018

(22) Filed: Oct. 10, 2017

(65) Prior Publication Data

US 2018/0100113 A1  Apr. 12, 2018

Related U.S. Application Data

(60) Provisional application No. 62/406,685, filed on Oct. 11, 2016.

(51) Int. Cl.
| | | |
|---|---|---|
| *C10M 107/38* | (2006.01) | |
| *C08L 59/02* | (2006.01) | |
| *C08L 27/18* | (2006.01) | |
| *B65G 17/40* | (2006.01) | |
| *C08L 23/30* | (2006.01) | |

(52) U.S. Cl.
CPC ........... *C10M 107/38* (2013.01); *B65G 17/40* (2013.01); *C08L 23/30* (2013.01); *C08L 27/18* (2013.01); *C08L 59/02* (2013.01); C08L 2205/03 (2013.01); C08L 2205/035 (2013.01); C10M 2213/0623 (2013.01)

(58) Field of Classification Search
CPC .......... C08L 23/30; C08L 59/02; C08L 27/18; B65G 17/40; C10M 107/38
USPC ........................................................ 524/512
See application file for complete search history.

(56) References Cited

U.S. PATENT DOCUMENTS

| | | | |
|---|---|---|---|
| 5,482,987 A * | 1/1996 | Forschirm | C08K 5/098 524/230 |
| 5,559,180 A | 9/1996 | Takahashi et al. | |
| 5,641,824 A | 6/1997 | Forschirm | |
| 5,686,176 A | 11/1997 | Adam et al. | |
| 5,962,376 A | 10/1999 | Yamazaki et al. | |
| 6,025,441 A * | 2/2000 | Koshirai | C08L 23/12 521/145 |
| 6,147,146 A | 11/2000 | Horio et al. | |
| 6,211,268 B1 | 4/2001 | Matsumura et al. | |
| 6,284,828 B1 | 9/2001 | Takayama | |
| 6,590,020 B1 | 7/2003 | Eberle et al. | |
| 7,527,859 B2 | 5/2009 | Zhong et al. | |
| 7,557,154 B2 | 7/2009 | Agarwal et al. | |
| 7,625,969 B2 | 12/2009 | Sonobe et al. | |
| 7,645,821 B2 | 1/2010 | Disch et al. | |
| 7,772,310 B2 | 8/2010 | Sonobe et al. | |
| 7,795,320 B2 | 9/2010 | Determan et al. | |
| 7,807,745 B2 | 10/2010 | Agarwal et al. | |
| 7,855,238 B2 | 12/2010 | Cohoon et al. | |
| 7,923,506 B2 | 4/2011 | Cohoon et al. | |
| 7,935,737 B2 | 5/2011 | Gopal et al. | |
| 8,034,866 B2 | 10/2011 | Zhu et al. | |
| 8,067,493 B2 | 10/2011 | Zhu et al. | |
| 8,110,609 B2 | 2/2012 | Determan et al. | |
| 8,680,167 B2 | 3/2014 | Agarwal et al. | |
| 9,376,558 B2 | 6/2016 | Price et al. | |
| 2005/0143508 A1 | 6/2005 | Tyagi et al. | |
| 2006/0052492 A1 | 3/2006 | Harashina et al. | |
| 2006/0063863 A1 | 3/2006 | Sunaga et al. | |
| 2007/0073007 A1 | 3/2007 | Harashina | |
| 2007/0105989 A1 * | 5/2007 | Disch | C08K 5/34922 524/100 |
| 2009/0143508 A1 | 6/2009 | Bessho et al. | |
| 2009/0234050 A1 | 9/2009 | Wada et al. | |
| 2011/0086952 A1 | 4/2011 | Bessho et al. | |
| 2011/0184098 A1 | 7/2011 | Sunaga et al. | |
| 2012/0277353 A1 | 11/2012 | Mulholland | |
| 2013/0102718 A1 * | 4/2013 | Markgraf | C08L 71/00 524/354 |
| 2014/0329729 A1 | 11/2014 | Becker-Willinger et al. | |

(Continued)

FOREIGN PATENT DOCUMENTS

| | | |
|---|---|---|
| CN | 101575437 | 11/2009 |
| CN | 104045965 | 9/2014 |
| DE | 4445316 | 6/1996 |

(Continued)

OTHER PUBLICATIONS

Ticona Engineering Polymers, Celanese, GUR 4120 PE, Published in Jan. 2007.*

(Continued)

*Primary Examiner* — Deve V Hall
(74) *Attorney, Agent, or Firm* — Dority & Manning, P.A.

(57) ABSTRACT

A tribologically modified polyoxymethylene polymer composition is disclosed. The polyoxymethylene polymer composition is comprised of a polyoxymethylene polymer in combination with a tribological modifier system. The tribological modifier system may include the combination of a fluoropolymer with a high density polyethylene, such as an oxidized high density polyethylene. The particular formulation provides a synergistic blend of properties. For instance, the polymer composition not only has an excellent surface appearance when molded into articles but has excellent low friction characteristics when tested against aluminum.

19 Claims, 1 Drawing Sheet

(56) References Cited

U.S. PATENT DOCUMENTS

2016/0096196 A1* 4/2016 Papke .................. A47L 15/50
524/432

FOREIGN PATENT DOCUMENTS

| | | |
|---|---|---|
| EP | 0617085 | 9/1994 |
| EP | 1 522 554 | 11/2006 |
| EP | 2712827 | 2/2014 |
| JP | 2010189463 | 9/2010 |
| JP | 2015124056 | 7/2015 |
| WO | WO 9946331 | 9/1999 |
| WO | WO0063291 | 10/2000 |
| WO | WO2007/012469 | 1/2007 |

OTHER PUBLICATIONS

PCT/IB2017/056265 International Search Report and Written Opinion dated Jan. 18, 2018.
Co-Pending U.S. Appl. No. 15/915,521, dated Mar. 8, 2018.

* cited by examiner

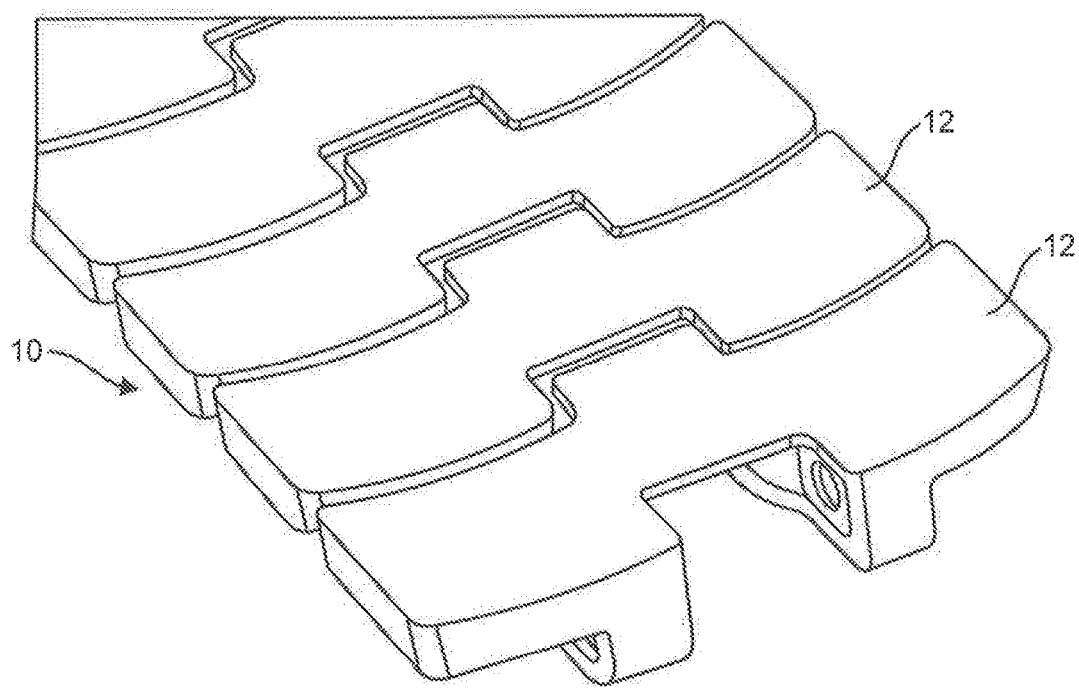

WEAR RESISTANT POLYMER COMPOSITION HAVING IMPROVED SURFACE APPEARANCE

RELATED APPLICATIONS

The present application is based on and claims priority to U.S. Provisional Patent Application Ser. No. 62/406,685, filed on Oct. 11, 2016, and which is incorporated herein by reference.

BACKGROUND

Polyacetal polymers, which are commonly referred to as polyoxymethylene polymers, have become established as exceptionally useful engineering materials in a variety of applications. For instance, because polyoxymethylene polymers have excellent mechanical properties, fatigue resistance, abrasion resistance, chemical resistance, and moldability, they are widely used in constructing polymer articles, such as articles for use in the automotive industry and the electrical industry.

The mechanical properties of polyoxymethylene molding compositions are the reason for their use in numerous applications. To improve their properties, polyoxymethylene polymers are often provided with additives to adapt the properties for a specific application, for example by using reinforcing fibers or tribological modifiers. For instance, polyoxymethylene polymers have been combined with a tribological modifier for producing polymer compositions well suited for use in tribological applications where the polymer article is in moving contact with other articles, such as metal articles, plastic articles, and the like. These tribological applications can include embodiments where the polymer composition is formed into gear wheels, pulleys, sliding elements, and the like. The addition of a tribological modifier can provide a composition with a reduced coefficient of friction and low wear.

In the past, high molecular weight polyolefins have been used to improve the wear resistance of polyoxymethylene resins. For instance, U.S. Pat. No. 5,482,987, which is incorporated herein by reference in its entirety, discloses a self-lubricating, low wear composition containing a polyoxymethylene and a lubricating system comprising a high molecular weight polyethylene. U.S. Pat. No. 5,641,824, which is incorporated herein by reference in its entirety, discloses a self-lubricating melt blend of a polyoxymethylene and an ultra-high molecular weight polyethylene.

In addition to high molecular weight polyolefins, numerous other tribological modifiers have been proposed in the past. For instance, other tribological modifiers that have been used in the past include silicones such as silicone oil, polysiloxane, waxes, and the like. Each tribological modifier can display different properties depending upon the particular application. Thus, the use of tribological modifiers in particular applications has been somewhat unpredictable.

In certain applications, in addition to reducing the coefficient of friction and reducing wear, it is desirable that the polymer composition also have aesthetic appeal. For instance, although tribological modifiers can produce compositions having low friction characteristics, the triological modifiers can have a tendency to create surface imperfections on molded articles made from the compositions and/or may adversely interfere with colorants that may be added to the composition. Thus, finding a tribological modifier that not only reduces the coefficient of friction but also that does not interfere with the surface characteristics of molded articles made from the composition has been problematic. In this regard, the present disclosure is directed to polymer compositions that have low friction characteristics, especially when tested against metals such as aluminum, and that are compatible with colorants without producing significant amounts of surface imperfections during molding.

SUMMARY

According to one embodiment, the present disclosure is directed to a polymer composition. The composition is comprised of a polyoxymethylene polymer combined with a tribological modifier system that produces a polymer composition with excellent low friction characteristics, especially when the polymer composition is tested against metals, such as aluminum. The particular tribological modifier system of the present disclosure has also been found to produce excellent surface appearance when the composition is molded into a product or part. For instance, not only is the tribological modifier system compatible with many coloring agents, but also does not produce streaks or other surface imperfections even after repeated use.

In one embodiment, the tribological system combined with the polyoxymethylene polymer comprises a blend of a first tribological modifier and a second tribological modifier. The first tribological modifier can comprise a fluoropolymer, such as polytetrafluoroethylene. In one embodiment, for instance, the first tribological modifier comprises polytetrafluoroethylene particles. The particles can have a mean particle diameter of from about 1 micron to about 10 microns, such as from about 3 microns to about 10 microns, when tested according to ISO Test 13321. The first tribological modifier can be present in the polymer composition in an amount greater than about 0.5% by weight, such as in an amount greater than about 1% by weight, such as in an amount greater than about 1.5% by weight. The first tribological modifier is generally present in an amount less than about 5% by weight, such as in an amount less than about 3% by weight, such as in an amount less than about 2.5% by weight.

The second tribological modifier, on the other hand, can comprise a polyolefin polymer. The polyolefin polymer can comprise a high density polyethylene. The high density polyethylene, for instance, may comprise an oxidized high density polyethylene homopolymer. The high density polyethylene can have a Shore D hardness of from about 69 to about 80. The high density polyethylene can have a density of greater than about 0.94 $g/cm^3$, such as greater than about 0.95 $g/cm^3$, such as greater than about 0.96 $g/cm^3$, such as greater than about 0.97 $g/cm^3$. The density is generally less than about 1 $g/cm^3$, such as less than about 0.99 $g/cm^3$.

The first tribological modifier and the second tribological modifier synergistically work together to dramatically reduce the coefficient of friction of the polymer composition when tested against many materials, such as aluminum. For instance, the polymer composition can display a dynamic coefficient of friction of less than about 0.2, such as less than about 0.18, such as less than about 0.16, such as less than about 0.14, such as less than about 0.12, such as less than about 0.1, such as less than about 0.08 when tested against aluminum. In one embodiment, the dynamic coefficient of friction is substantially 0. In addition, the polymer composition can exhibit a wear track depth when tested against aluminum of less than about 2 microns, such as less than about 1.5 microns, such as less than about 1 micron, such as less than about 0.5 microns, such as less than about 0.3 microns, such as less than about 0.1 microns. The dynamic coefficient of friction can be tested according to VDA Test 230-206. During the VDA 230-206 Test, a ball-on-plate configuration is used. A steel ball is used having an $R_z$ of 1 to 5 microns. The force was 30 N and the velocity was 150 mm/s. The movement was oscillating. The output of the VDA 230-206 Test is static coefficient of friction, dynamic coefficient of friction, and abrasion width of the system. In addition, the wear track depth can be measured using any suitable depth sensing device that is accurate to hundredths of a micron.

In addition to the excellent low friction characteristics as described above, the polymer composition also unexpectedly produces little to no surface defects when molded into polymer products, articles and parts. The tribological modifier system, for instance, has been found to be completely compatible with many coloring agents. In fact, the tribological modifier system is compatible with a mixture of coloring agents. In this regard, the surface appearance of molded articles made according to the present disclosure is excellent, even after being subjected to extended wear trials.

In one embodiment, the polymer composition only contains the first tribological modifier and the second tribological modifier described above and does not contain any further tribological modifiers, such as a silicone or an ultrahigh molecular weight polyethylene. In addition to the tribological modifiers, the polymer composition may contain various other components. For instance, the composition can also contain one or more acid scavengers, a nucleant, and a formaldehyde scavenger, such as a copolyamide. The polymer composition can also contain one or more coloring agents. The coloring agents can be present in the composition in an amount from about 0.3% to about 2% by weight. Coloring agents that may be present in the composition include titanium dioxide, carbon black, a pigment such as a yellow pigment or a green pigment, and mixtures thereof. In one embodiment, the polymer composition contains a mixture of titanium dioxide, carbon black, and at least one other pigment, such as a combination of a yellow and a green pigment.

The polymer composition of the present disclosure is particularly well suited for producing sliding members that are intended to contact metallic components or products. For example, the polymer composition of the present disclosure is well suited to producing conveyor parts that are intended to convey aluminum containers, such as beverage cans. As described above, the polymer composition of the present disclosure has excellent low friction characteristics when tested against aluminum.

In one embodiment, the present disclosure is directed to a conveyor device that comprises a conveyor chain that moves over a track. The conveyor chain can include a plurality of conveyor components having a top surface for receiving and transporting products, such as beverage cans. The conveyor components can be made from the polymer composition as described above.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a perspective view of one embodiment of a conveyor chain made in accordance with the present disclosure.

Repeat use of reference characters in the present specification and drawings is intended to represent the same or analogous features or elements of the present invention.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

In general, the present disclosure is directed to a polyoxymethylene polymer composition and to polymer articles made from the composition. The polymer composition contains a polyoxymethylene polymer and has improved tribological properties such as excellent low friction characteristics, especially when tested against a metal such as aluminum. In addition, the polymer composition can be formulated so as to have dramatically enhanced surface appearance when molded into polymer articles.

In the past, problems have been experienced in producing wear resistant materials that have good aesthetic qualities when molded into parts and articles. The addition of tribological modifiers into a polymer composition can improve wear but can also significantly deteriorate the surface appearance. In this regard, the present disclosure is directed to a polyoxymethylene polymer composition containing a tribological modifier system for reducing the coefficient of friction of the material, without compromising the surface appearance properties. Parts and articles made according to the present disclosure, for instance, can have a superior surface finish and can have excellent low friction characteristics when tested against metals, such as aluminum. The polymer composition of the present disclosure can be mixed with one or more coloring agents to produce parts not only having excellent aesthetic qualities but also having low friction characteristics.

In one particular embodiment, the polymer composition comprises a polyoxymethylene polymer combined with a tribological modifier system including a first tribological modifier and a second tribological modifier. The first tribological modifier may comprise a fluoropolymer, while the second tribological modifier may comprise a high density polyolefin, such as a high density polyethylene. The composition can also contain various other additives and components that further enhance various properties of the composition.

In general, any suitable polyoxymethylene polymer may be incorporated into the polymer composition.

The preparation of the polyoxymethylene polymer can be carried out by polymerization of polyoxymethylene-forming monomers, such as trioxane or a mixture of trioxane and a cyclic acetal such as dioxolane in the presence of a molecular weight regulator, such as a glycol. The polyoxymethylene polymer used in the polymer composition may comprise a homopolymer or a copolymer. According to one embodiment, the polyoxymethylene is a homo- or copolymer which comprises at least 50 mol. %, such as at least 75 mol. %, such as at least 90 mol. % and such as even at least 97 mol. % of —$CH_2O$-repeat units.

In one embodiment, a polyoxymethylene copolymer is used. The copolymer can contain from about 0.1 mol. % to about 20 mol. % and in particular from about 0.5 mol. % to about 10 mol. % of repeat units that comprise a saturated or ethylenically unsaturated alkylene group having at least 2 carbon atoms, or a cycloalkylene group, which has sulfur atoms or oxygen atoms in the chain and may include one or more substituents selected from the group consisting of alkyl cycloalkyl, aryl, aralkyl, heteroaryl, halogen or alkoxy. In one embodiment, a cyclic ether or acetal is used that can be introduced into the copolymer via a ring-opening reaction.

Preferred cyclic ethers or acetals are those of the formula:

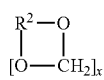

in which x is 0 or 1 and $R^2$ is a $C_2$-$C_4$-alkylene group which, if appropriate, has one or more substituents which are $C_1$-$C_4$-akyl groups, or are $C_1$-$C_4$-alkoxy groups, and/or are halogen atoms, preferably chlorine atoms. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers. It is particularly advantageous to use copolymers composed of from 99.5 to 95 mol. % of trioxane and of from 0.5 to 5 mol. %, such as from 0.5 to 4 mol. %, of one of the above-mentioned comonomers.

The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted.

In one embodiment, the polyoxymethylene polymer used in the polymer composition may contain a relatively high amount of reactive groups or functional groups in the terminal positions. The reactive groups, for instance, may comprise —OH or —$NH_2$ groups.

In one embodiment, the polyoxymethylene polymer can have terminal hydroxyl groups, for example hydroxyethylene groups and/or hydroxyl side groups, in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

In one embodiment, the polyoxymethylene polymer has a content of terminal hydroxyl groups of at least 15 mmol/kg, such as at least 18 mmol/kg, such as at least 20 mmol/kg. In one embodiment, the terminal hydroxyl group content ranges from 18 to 50 mmol/kg. In an alternative embodiment, the polyoxymethylene polymer may contain terminal hydroxyl groups in an amount less than 20 mmol/kg, such as less than 18 mmol/kg, such as less than 15 mmol/kg. For instance, the polyoxymethylene polymer may contain terminal hydroxyl groups in an amount from about 5 mmol/kg to about 20 mmol/kg, such as from about 5 mmol/kg to about 15 mmol/kg. For example, a polyoxymethylene polymer may be used that has a lower terminal hydroxyl group content but has a higher melt volume flow rate.

In addition to or instead of the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of —$CH_2O$-repeat units.

In one embodiment, a polyoxymethylene polymer can be produced using a cationic polymerization process followed by solution hydrolysis to remove any unstable end groups. During cationic polymerization, a glycol, such as ethylene glycol or methylal can be used as a chain terminating agent. A heteropoly acid, triflic acid or a boron compound may be used as the catalyst.

The polyoxymethylene polymer can have any suitable molecular weight. The molecular weight of the polymer, for instance, can be from about 4,000 grams per mole to about 20,000 g/mol. In other embodiments, however, the molecular weight can be well above 20,000 g/mol, such as from about 20,000 g/mol to about 100,000 g/mol.

The polyoxymethylene polymer present in the composition can generally have a melt flow index (MFI) ranging from about 1 to about 50 g/10 min, as determined according to ISO 1133 at 190° C. and 2.16 kg, though polyoxymethylenes having a higher or lower melt flow index are also encompassed herein. For example, the polyoxymethylene polymer may be a low or mid-molecular weight polyoxymethylene that has a melt flow index of greater than about 5 g/10 min, greater than about 10 g/10 min, or greater than about 15 g/10 min. The melt flow index of the polyoxymethylene polymer can be less than about 25 g/10 min, less than about 20 g/10 min, less than about 18 g/10 min, less than about 15 g/10 min, less than about 13 g/10 min, or less than about 12 g/10 min. The polyoxymethylene polymer may for instance be a high molecular weight polyoxymethylene that has a melt flow index of less than about 5 g/10 min, less than about 3 g/10 min, or less than about 2 g/10 min.

Suitable commercially available polyoxymethylene polymers are available under the trade name Hostaform® (HF) by Celanese/Ticona.

The polyoxymethylene polymer may be present in the polyoxymethylene polymer composition in an amount of at least 50 wt. %, such as at least 60 wt. %, such as at least 70 wt. %, such as at least 80 wt. %, such as at least 85 wt. %, such as at least 90 wt. %, such as at least 93 wt. %. In general, the polyoxymethylene polymer is present in an amount of less than about 100 wt. %, such as less than about 99 wt. %, such as less than about 97 wt. %, wherein the weight is based on the total weight of the polyoxymethylene polymer composition.

According to the present disclosure, the polyoxymethylene polymer is combined with at least one tribological modifier, and particularly two different tribological modifiers. The first tribological modifier comprises a fluoropolymer, such as a polytetrafluoroethylene powder. The polytetrafluoroethylene particles, for instance, can have an average particle size of less than about 15 microns, such as less than about 12 microns, such as less than about 10 microns, such as less than about 8 microns. The average particle size of the polytetrafluoroethylene particles is generally greater than about 0.5 microns, such as greater than about 1 micron, such as greater than about 2 microns, such as greater than about 3 microns, such as greater than about 4 microns, such as greater than about 5 microns. Average particle size can be measured according to ISO Test 13321.

In one embodiment, the polytetrafluoroethylene particles can have a relatively low molecular weight. The polytetrafluoroethylene polymer may have a density of from about 300 g/l to about 450 g/l, such as from about 325 g/l to about 375 g/l when tested according to ASTM Test D4895. The polytetrafluoroethylene particles can have a specific surface area of from about 5 $m^2/g$ to about 15 $m^2/g$, such as from about 8 $m^2/g$ to about 12 $m^2/g$ when tested according to Test DIN66132. The melt flow rate of the polytetrafluoroethylene polymer can be less than about 3 g/10 min, such as less than about 2 g/10 min when tested according to ISO Test 1133 when carried out at 372° C. with a load of 10 kg.

The polytetrafluoroethylene particles can be present in the polymer composition in an amount greater than about 0.5% by weight, such as in an amount greater than about 1% by weight, such as in an amount greater than about 1.5% by weight, such as in an amount greater than about 2% by weight. The polytetrafluoroethylene polymer is generally present in the polymer composition in an amount less than about 10% by weight, such as in an amount less than about 7% by weight, such as in an amount less than about 5% by weight, such as in an amount less than about 4% by weight, such as in an amount less than about 3% by weight.

In addition to a fluoropolymer, the polymer composition may contain a second tribological modifier. The second tribological modifier may comprise a polyolefin, such as a high density polyolefin. For example, the polymer composition may contain a high density polyethylene polymer. In one embodiment, the high density polyethylene may comprise an oxidized high density polyethylene. The high density polyethylene polymer, for instance, may have a density or specific gravity of greater than about 0.94 $g/cm^3$, such as greater than about 0.95 $g/cm^3$, such as greater than about 0.96 $g/cm^3$, such as greater than about 0.97 $g/cm^3$. The density is generally less than about 1 $g/cm^3$. The high density polyethylene can have a viscosity when tested at 150° C. of greater than about 1,000 cps, such as greater than about 2,000 cps, such as greater than about 4,000 cps, such as greater than about 6,000 cps, such as greater than about 8,000 cps. The viscosity is generally less than about 15,000 cps, such as less than about 10,000 cps. Viscosity is measured using a Brookfield rotational viscometer of Brookfield Engineering Laboratories, Middleboro, Mass. The high density polyethylene can have a Shore D hardness of greater than about 67, such as greater than about 68, such as greater than about 69. The Shore D hardness is generally less than about 80, such as less than about 75, such as less than about 73. Shore D hardness can be measured according to ASTM Test D785. The molecular weight of the polyethylene polymer is generally less than about 2 million, such as less than about 1 million.

The polyolefin tribological modifier can be present in the polymer composition in an amount greater than about 0.1% by weight, such as in an amount greater than about 0.5% by weight, such as in an amount greater than about 0.7% by weight. The polyolefin polymer is generally present in the composition in an amount less than about 5% by weight, such as in an amount less than about 4% by weight, such as in an amount less than about 3% by weight, such as in an amount less than about 2% by weight, such as in an amount less than about 1.5% by weight.

According to the present disclosure, tribological modifiers improve the tribological properties of the polyoxymethylene polymer compositions and polymer articles produced therefrom without the need for an external lubricant, such as water-based external lubricants, when utilized in tribological applications. An external lubricant may be a lubricant that is applied to a polymer article or polyoxymethylene based system of the present disclosure. In one embodiment, an external lubricant may not be associated with the polyoxymethylene polymer composition or polymer article such that the external lubricant is not present on a surface of the polyoxymethylene polymer composition or polymer article. In another embodiment, an external lubricant may be utilized with the polyoxymethylene polymer composition and polymer article of the present disclosure.

The polymer composition of the present disclosure may also contain other known additives such as, for example, antioxidants, formaldehyde scavengers, acid scavengers, UV stabilizers or heat stabilizers, reinforcing fibers. In addition, the compositions can contain processing auxiliaries, for example adhesion promoters, lubricants, nucleants, demolding agents, fillers, or antistatic agents and additives which impart a desired property to the compositions and articles or parts produced therefrom.

In one embodiment, an ultraviolet light stabilizer may be present. The ultraviolet light stabilizer may comprise a benzophenone, a benzotriazole, or a benzoate. The UV light absorber, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a formaldehyde scavenger, such as a nitrogen-containing compound, may be present. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

In one embodiment, the polymer composition may contain a copolyamide that may also serve as a formaldehyde scavenger. The copolyamide can have a softening point of generally greater than about 120° C., such as greater than about 130° C., such as greater than about 140° C., such as greater than about 150° C., such as greater than about 160° C., such as greater than about 170° C. The softening point of the copolyamide may be less than about 210° C., such as less than about 200° C., such as less than about 190° C., such as less than about 185° C. The copolyamide may have a melt viscosity at 230° C. of greater than about 7 Pa s, such as greater than about 8 Pa s, such as greater than about 9 Pa s. The melt viscosity is generally less than about 15 Pa s, such as less than about 14 Pa s, such as less than about 13 Pa s. In one embodiment, the copolyamide is ethanol soluble. In one embodiment, the copolyamide may comprise a polycondensation product of polymeric fatty acids with aliphatic diamines.

Further, the formaldehyde scavenger may be a guanamine compound which may include an aliphatic guanamine-based compound, an alicyclic guanamine-based compound, an aromatic guanamine-based compound, a hetero atom-containing guanamine-based compound, or the like. The formaldehyde scavenger may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, an acid scavenger may be present. The acid scavenger may comprise, for instance, an alkaline earth metal salt. For instance, the acid scavenger may comprise a calcium salt, such as a calcium citrate. In one embodiment, the acid scavenger may comprise tricalcium citrate. The acid scavenger may be present in an amount of at least about 0.001 wt. %, such as at least about 0.005 wt. %, such as at least about 0.0075 wt. % and less than about 1 wt. %, such as less than about 0.75 wt. %, such as less than about 0.5 wt. %, wherein the weight is based on the total weight of the respective polymer composition.

In one embodiment, a nucleant may be present. The nucleant may increase crystallinity and may comprise an oxymethylene terpolymer. In one particular embodiment, for instance, the nucleant may comprise a terpolymer of butanediol diglycidyl ether, ethylene oxide, and trioxane. The nucleant may be present in the composition in an amount of at least about 0.01 wt. %, such as at least about 0.05 wt. %, such as at least about 0.1 wt. % and less than about 2 wt. %, such as less than about 1.5 wt. %, such as less than about 1 wt. %, wherein the weight is based on the total weight of the respective polymer composition.

In one embodiment, an antioxidant, such as a sterically hindered phenol, may be present. Examples which are available commercially, are pentaerythrityl tetrakis[3-(3,5-di-tert-butyl-4-hydroxyphenyl)propionate], triethylene glycol bis[3-(3-tert-butyl-4-hydroxy-5-methylphenyl)propionate], 3,3'-bis[3-(3,5-di-tert-butyl-4-hydroxyphenyl) propionohydrazide], and hexamethylene glycol bis[3-(3,5-di-tert-butyl-4-hydroxyphenyl)propionate]. The antioxidant may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, lights stabilizers, such as sterically hindered amines, may be present in addition to the ultraviolet light stabilizer. Hindered amine light stabilizers that may be used include oligomeric hindered amine compounds that are N-methylated. For instance, hindered amine light stabilizer may comprise a high molecular weight hindered amine stabilizer. The light stabilizers, when present, may be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, lubricants may be present. The lubricant may comprise a polymer wax composition. Further, in one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. In another embodiment, a fatty acid amide such as ethylene bis(stearamide) may be present. Lubricants may generally be present in the polymer composition in an amount of at least about 0.01 wt. %, such as at least about 0.05 wt. %, such as at least about 0.075 wt. % and less than about 1 wt. %, such as less than about 0.75 wt. %, such as less than about 0.5 wt. %, wherein the weight is based on the total weight of the respective polymer composition.

In one embodiment, a coloring agent may be present. Coloring agents that may be used include any desired inorganic pigments, such as titanium dioxide, ultramarine blue, cobalt blue, and other organic pigments and dyes, such as phthalocyanines, anthraquinnones, and the like. Other coloring agents include carbon black or various other polymer-soluble dyes. In one embodiment, a combination of coloring agents may be included in the polymer composition. For instance, the polymer composition may contain titanium dioxide in combination with carbon black. In an alternative embodiment, the coloring agents present in the polymer composition may comprise titanium dioxide in combination with at least one color pigment, such as a yellow pigment and a green pigment and optionally further in combination with carbon black. The coloring agent may be present in the composition in an amount of at least about 0.01 wt. %, such as at least about 0.05 wt. %, such as at least about 0.1 wt. %, such as at least about 0.5 wt. %, such as at least about 0.8 wt. %, such as at least about 1 wt. % and less than about 5 wt. %, such as less than about 2.5 wt. %, such as less than about 1 wt. %, wherein the weight is based on the total weight of the respective polymer composition.

The compositions of the present disclosure can be compounded and formed into a polymer article using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 100 to 280° C., such as from 120 to 260° C., such as from 140 to 240° C. or 180 to 220° C.

After extrusion, the compositions may be formed into pellets. The pellets can be molded into polymer articles by techniques known in the art such as injection molding, thermoforming, blow molding, rotational molding and the like. According to the present disclosure, the polymer articles demonstrate excellent tribological behavior and mechanical properties. Consequently, the polymer articles can be used for several applications where low wear and excellent gliding properties are desired.

Polymer articles include any moving articles or moldings that are in contact with another surface and may require high tribological requirements. For instance, polymer articles include articles for the automotive industry, especially housings, latches such as rotary latches, window winding systems, wiper systems, pulleys, sun roof systems, seat adjustments, levers, bushes, gears, gear boxes, claws, pivot housings, wiper arms, brackets or seat rail bearings, zippers, switches, cams, rollers or rolling guides, sliding elements or glides such as sliding plates, conveyor belt parts such as chain elements and links, castors, fasteners, levers, conveyor system wear strips and guard rails, medical equipment such as medical inhalers and injectors. An almost limitless variety of polymer articles may be formed from the polymer compositions of the present disclosure.

In one embodiment, polymer articles made in accordance with the present disclosure can be used to make components of a conveyor system. Conveyor systems, for instance, typically include a conveyor chain that moves over a track. Such conveyor systems can be used to move all different types of products and goods. In one embodiment, for instance, such conveyors are used to transport metal products, such as beverage cans made from aluminum. In placing the beverage cans on the conveyor system, the cans typically have to move across the surface of the conveyor when being loaded onto the conveyor and when being unloaded from the conveyor into packages. In the past, problems have been experienced in providing a conveyor chain surface that not only has low friction characteristics with respect to aluminum, but that also is wear resistant. Also important is the ability to produce a conveyor chain that has a surface appearance that does not degrade over time. The composition of the present disclosure is particularly well suited to molding articles that can be used as conveyor chain components. In particular, the components made according to the present disclosure can have a surface over which the metal products may slide.

Referring to FIG. 1, for instance, one embodiment of a portion of a conveyor chain 10 is illustrated. As shown, the conveyor chain 10 is made from a plurality of conveyor components 12 or links. Each of the conveyor components 2 includes a top surface for receiving and transporting products. In accordance with the present disclosure, the conveyor component 12 can be made from the polymer composition of the present disclosure. Of particular advantage, the conveyor component 12 can include one or more coloring agents that provide the components with a desired surface appearance.

Utilizing the polyoxymethylene polymer composition and polymer article produced therefrom according to the present disclosure provides compositions and articles with improved tribological properties. According to the present disclosure, the tribological properties are generally measured by the coefficient of friction.

In general, static friction is the friction between two or more surfaces that are not moving relative to each other (ie., both objects are stationary). In general, dynamic friction occurs when two objects are moving relative to each other (ie., at least one object is in motion or repeated back and forth motion). In addition, stick-slip is generally known as a phenomenon caused by continuous alternating between static and dynamic friction.

According to the present disclosure, the composition and polymer article may exhibit a dynamic coefficient of friction against aluminum, as determined according to VDA 230-206, of generally less than about 0.3, such as less than about 0.25, such as less than about 0.2, such as less than about 0.1. The dynamic coefficient of friction is generally greater than 0. The above dynamic coefficient of friction is measured with a force of 30 N, a velocity of 150 mm/s, and after 5,000 cycles using a plate made from the composition and a counterpart ball of aluminum.

Polymer compositions according to the present disclosure when tested against aluminum may exhibit a depth of wear of less than about 2 microns, such as less than about 1 micron, such as less than about 0.5 microns. The depth of wear can be even 0.

While the polyoxymethylene polymer composition and polymer articles produced therefrom of the present invention provide improved tribological properties, the compositions and articles may also exhibit excellent mechanical properties (ISO Test 527). For example, when tested according to ISO Test No. 527, the polymer composition may have a tensile modulus of greater than about 5,000 MPa, such as greater than about 5,500 MPa, such as greater than about 5,700 MPa. The tensile modulus is generally less than about 10,000 MPa. In one embodiment, the strength at break can be greater than about 100 MPa, such as greater than about 110 MPa.

The polymer composition can exhibit a notched Charpy impact strength at 23° C. (ISO Test 179-1) of greater than about 8 kJ/m$^2$, such as greater than about 9 kJ/m$^2$, such as greater than about 9.5 kJ/m$^2$. The notched Charpy impact strength is generally less than about 20 kJ/m$^2$.

The polymer composition can exhibit a melt volume ratio of from about 0.5 cm$^3$/10 min to about 5 cm$^3$/10 min in certain embodiments. In one embodiment, the melt volume ratio is from about 1.5 cm$^3$/10 min to about 2 cm$^3$/10 min. Melt volume ratio can be measured at 190° C. and at a load of 2.16 kilograms.

The present disclosure may be better understood with reference to the following examples.

EXAMPLE

In this example, various polymer compositions were formulated and tested for tribological properties.

The polymer composition contained a polyoxymethylene polymer composition combined with at least one tribological modifier.

The components of each respective composition were mixed together and compounded using a ZSK 25MC (Werner & Pfleiderer, Germany) twin screw extruder (zone temperature 190° C., melt temperature about 210° C.). The screw configuration with kneading elements was chosen so that effective thorough mixing of the components took place. The compositions were extruded and pelletized. The pellets were dried for 8 hours at 120° C. and then injection molded.

The polymer compositions were tested for dynamic coefficient of friction and wear depth according to the test procedures described above. The surface appearance of the articles was also categorized. Various different tribological modifiers were tested in different combinations for purposes of comparison. The following results were obtained:

TABLE NO. 1

| POM Tribo-modifier (wt-%) | | | | | Wear | | |
|---|---|---|---|---|---|---|---|
| PTFE | HD PE | LDPE-graft-PSAN | UHMW-PE | UHMW-Si | CoF vs. Aluminum | Depth (μm) | Surface appearance |
| 3 | 0 | 0 | 0 | 0 | 0.2 | 0 | Poor |
| 1.5 | 0 | 0 | 0 | 1.5 | 0.186 | 12.93 | Excellent |
| 2 | 0 | 0 | 1 | 0 | 0.267 | 0 | Poor |
| 2 | 0 | 0 | 0 | 0.8 | 0.167 | 8.58 | Excellent |
| 2 | 0.5 | 0 | 1 | 0 | 0.232 | 0 | Excellent |
| 2 | 0 | 1.5 | 0 | 0 | 0.178 | 0 | Good |
| 2.5 | 0 | 0 | 1 | 0 | 0.19 | 0 | Poor |
| 2.5 | 0.4 | 0 | 1 | 0 | 0.195 | 0 | Excellent |

TABLE NO. 1-continued

| POM Tribo-modifier (wt-%) | | | | | Wear | | |
|---|---|---|---|---|---|---|---|
| PTFE | HD PE | LDPE-graft-PSAN | UHMW-PE | UHMW-Si | CoF vs. Aluminum | Depth (μm) | Surface appearance |
| 2.5 | 0 | 1 | 0 | 0 | 0.175 | 0 | Poor |
| 2.5 | 0.4 | 1 | 0 | 0 | 0.192 | 0 | Excellent |
| 2.5 | 1 | 0 | 0 | 0 | 0.160 | 0 | Excellent |

As shown above, the use of tribological modifiers produces unpredictable results. As shown above, the combination of polytetrafluoroethylene with a high density polyethylene produced significantly better results with an excellent surface appearance.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part.

What is claimed:

1. A polymer composition comprising:
   a polyoxymethylene polymer;
   a first tribological modifier comprising a fluoropolymer, the fluoropolymer being present in the composition in an amount of at least about 1% by weight; and
   a second tribological modifier comprising a high density polyethylene, the high density polyethylene having a density greater than 0.94 g/cm$^3$ and less than about 0.99 g/cm$^3$.

2. A polymer composition as defined in claim 1, wherein the polymer composition has a dynamic coefficient of friction against a countermaterial of less than about 0.2, the countermaterial comprising aluminum.

3. A polymer composition as defined in claim 1, wherein the composition exhibits a wear track depth of less than 2 microns when tested against aluminum.

4. A polymer composition as defined in claim 1, wherein the first tribological modifier comprises polytetrafluoroethylene particles.

5. A polymer composition as defined in claim 4, wherein the polytetrafluoroethylene particles have an average particle size of from about 1 micron to about 10 microns when tested according to ISO Test 13321.

6. A polymer composition as defined in claim 1, wherein the high density polyethylene polymer has a Shore D hardness of from about 69 to about 80 when tested according to ASTM Test D785.

7. A polymer composition as defined in claim 1, wherein the high density polyethylene polymer comprises an oxidized high density polyethylene homopolymer.

8. A polymer composition as defined in claim 1, wherein the high density polyethylene polymer has a density of from 0.95 g/cm$^3$ to about 0.99 g/cm$^3$.

9. A polymer composition as defined in claim 1, wherein the composition does not contain any other tribological modifiers.

10. A polymer composition as defined in claim 1, wherein the fluoropolymer is present in the composition in an amount from about 1.5% to about 3% by weight and the high density polyethylene is present in the composition in an amount from about 0.3% to about 3% by weight.

11. A polymer composition as defined in claim 1, wherein the polymer composition further contains a lubricant.

12. A polymer composition as defined in claim 1, wherein the polymer composition further contains a copolyamide.

13. A polymer composition as defined in claim 1, wherein the polymer composition further contains an acid scavenger.

14. A polymer composition as defined in claim 13, wherein the acid scavenger comprises tricalcium citrate.

15. A polymer composition as defined in claim 1, wherein the polymer composition further contains a nucleant, wherein the nucleant comprises a polyoxymethylene terpolymer.

16. A polymer composition as defined in claim 1, wherein the polymer composition further contains one or more coloring agents, the one or more coloring agents being present in the composition in an amount from about 0.3% to about 2% by weight.

17. A polymer composition as defined in claim 16, wherein the one or more coloring agents comprises titanium dioxide, carbon black, a pigment, or mixtures thereof.

18. A polymer composition as defined in claim 1, wherein the polyoxymethylene polymer is present in the composition in an amount of at least 85% by weight.

19. A polymer composition comprising;
   a polyoxymethylene polymer;
   a first tribological modifier comprising a fluoropolymer, the fluoropolymer being present in the composition in an amount of at least about 1% by weight;
   a second tribological modifier comprising a high density polyethylene, the high density polyethylene having a density of greater than 0.94 g/cm$^3$ to about 0.99 g/cm$^3$; and
   a third tribological modifier comprising an ultrahigh molecular weight polyethylene.

* * * * *